United States Patent [19]
Owens, Jr.

[11] 3,860,822
[45] Jan. 14, 1975

[54] SYSTEM FOR RECORDING AND INTEGRATING TRANSIENT NUCLEAR SCINTILLATIONS

[75] Inventor: Robert C. Owens, Jr., Palos Verdes Peninsula, Calif.

[73] Assignee: Vas Ltd., Torrance, Calif.

[22] Filed: Jan. 10, 1973

[21] Appl. No.: 322,370

[52] U.S. Cl. .............................. 250/363, 250/369
[51] Int. Cl. .............................................. G01t 1/20
[58] Field of Search ............ 250/363, 366, 369, 327

[56] References Cited
UNITED STATES PATENTS
| | | | |
|---|---|---|---|
| 3,491,239 | 1/1970 | Dalman | 250/363 |
| 3,591,806 | 7/1971 | Brill et al. | 250/366 |
| 3,622,785 | 11/1971 | Irwin et al. | 250/363 |
| 3,659,103 | 4/1972 | Cassen | 250/363 |

Primary Examiner—Archie R. Borchelt
Attorney, Agent, or Firm—Flehr, Hohbach, Test, Albritton & Herbert

[57] ABSTRACT

A system for recording transient nuclear scintillations comprising a source of nuclear radiation as in a patient, means for detecting and converting the radiation into an electronic display of random scintillating sensible dots disposed with respect to horizontal and vertical axes upon the display, a video camera disposed in alignment with the display for viewing the display directly, a cyclically moving record medium for recording from the video camera, video sync pulses prerecorded on the medium, and means for unblanking the camera to discharge accumulated representations of the scintillations stored on the target of the camera so as to be recorded as a video field on a track of the medium in a manner to be reproduced between successive sync pulses.

3 Claims, 1 Drawing Figure

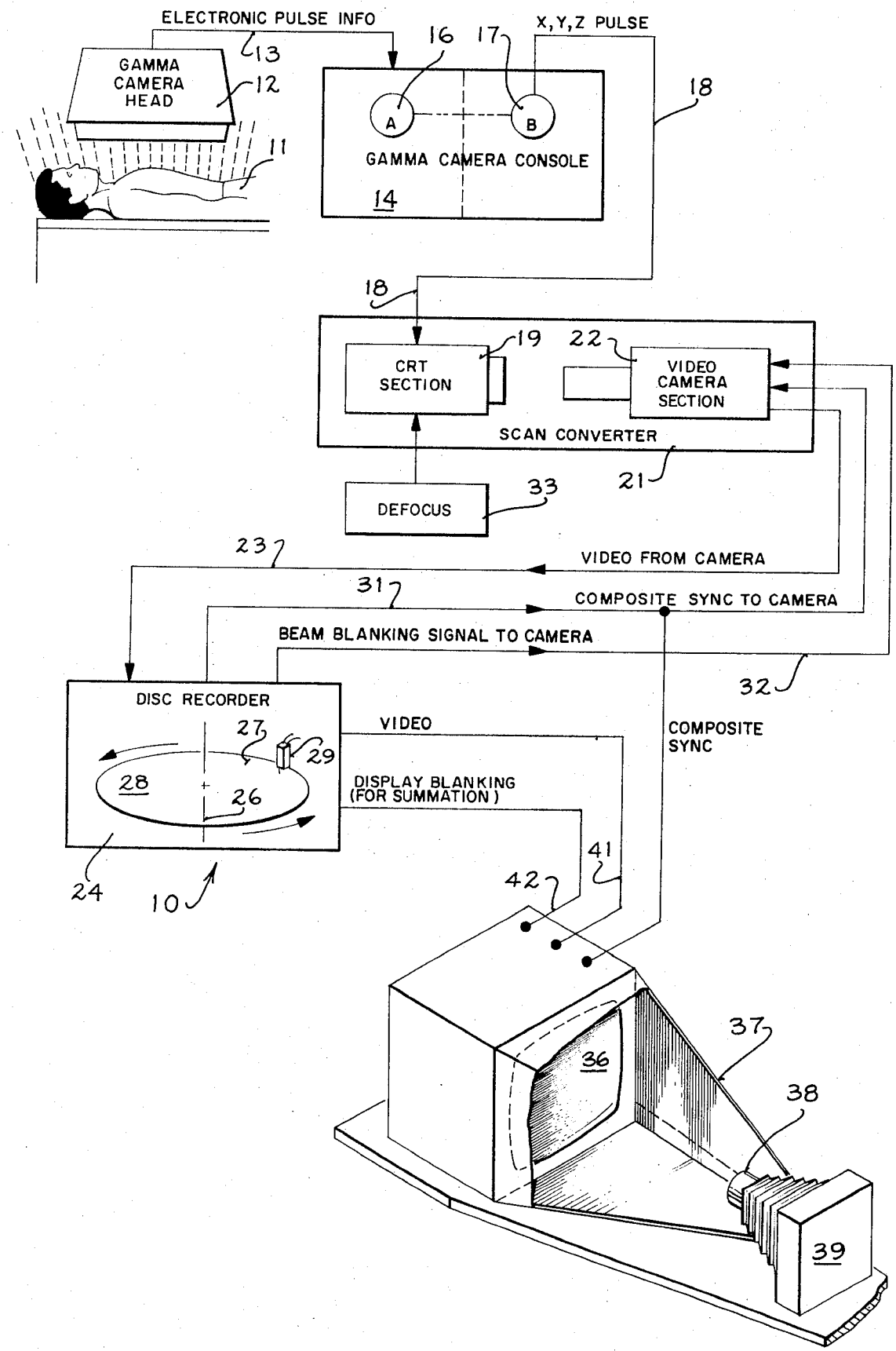

SYSTEM FOR RECORDING AND INTEGRATING TRANSIENT NUCLEAR SCINTILLATIONS

BACKGROUND OF THE INVENTION

This invention pertains to a system providing a display of nuclear scintillations derived from a source of nuclear radiation and to a means for electronically integrating successive short periods of such scintillations and for recording such successive short scintillations in a successive number of tracks on a cyclic record medium.

Heretofore, so-called gamma consoles involving a gamma camera head have been employed of a type as presently marketed and serving to provide a cathode ray tube display of dots, each of which is representative of a gamma scintillation and suitably controlled to indicate on the face of the cathode ray tube display the X-Y location of the radiating source, i.e. with respect to the horizontal and vertical axes. It has been necessary in treating patients to determine the location on the display wherein the various significant concentrations of scintillations exist. In order to do this in the past, a camera has been mounted to the display and its film exposed over a reasonably prolonged period of time and upon development of the film the greatest concentration of exposure will be readily evident.

A film thus developed shows only a single result and fails entirely to provide any dynamic information of the flow of radioactive material in a patient's body during the period of time of the accumulation of the information. Hence, the foregoing manner of evaluating the concentrations of radioactive material in a patient's body while being of limited utility have not been entirely successful.

As disclosed herein, a system is provided whereby the scintillations are integrated and recorded over a number of successive short intervals onto a cyclic magnetic record medium whereby the developing concentration of scintillations in a given region can be examined many times without requiring the patient to endure a number of repeated evaluations. This is particularly important when it is understood that the injection into a patient's veins of radioactive material usually requires something on the order of a week or so in order to dissipate the radioactive effect of the material from the patient's system so as to put the patient in condition for a second test.

By recording a series of short integrated periods of accumulations of scintillations as disclosed herein, the flow rate of the material through the patient's system can be readily adjusted by increasing or decreasing the rate of reproduction of the recorded material.

Thus, where each of a number of tracks on a magnetic record disc is recorded with scintillations integrated over a short period of time, the flow rate can be controlled by playing the tracks on the disc at a high or a low rate and thereby vary the flow rate of the accumulation of the nuclear material in the patient. This technique provides much additional valuable information in diagnosing physical conditions of patients and has been useful.

SUMMARY OF THE INVENTION AND OBJECTS

In general, there has been provided a system for recording transient nuclear scintillations comprising a source of nuclear radiation such as a portion of a patient's body containing a nuclear material, means for detecting and converting the radiation into an electronic display of random scintillating sensible dots disposed with respect to horizontal and vertical axes within the display, and a video camera disposed in alignment with the display for viewing the display. A cyclically moving record medium such as a magnetic record disc containing video sync pulses recorded thereon is arranged to have a number of discrete tracks to be recorded upon by successive exposures from the video camera. Means for unblanking the camera so as to discharge accumulated representations of the scintillations stored on the target of the camera so as to be recorded as a video field on a track of the medium in a manner to be reproduced between the sync pulses provides a succession of integrated exposures to scintillations to be recorded in discrete tracks on the record medium.

In addition, the system further includes preferably a cathode ray tube having deflection plates forming a part of the display and means directly coupled to the deflection plates for defocussing the dot on the display so as to manipulate the size, shape, focus, and brightness of the dots.

In general, it is an object of the present invention to provide an improved means for integrating nuclear scintillations observed by a gamma camera, and method.

It is a further object of the present invention to provide a means for dynamically observing the accumulation of scintillations in the manner capable of being played back at various speeds.

The foregoing and other objects of the invention will become more readily apparent from the following detailed description of a preferred embodiment when considered in conjunction with the drawing.

The single FIGURE of the drawing shows a schematic block diagram of a system for recording transient integrations of nuclear scintillations in each of a number of separate tracks on a cyclically moving record medium.

BRIEF DESCRIPTION OF A PREFERRED EMBODIMENT

The system 10 for recording transient nuclear scintillations comprises a source of nuclear radiation 11 such as the patient who has received an injection of nuclear medicine such as radioactive iodine or the like and after a limited period of circulation in his system radiates outwardly to a gamma camera head 12. The gamma head 12 is of conventional design including a collimator construction, an image intensifier and photomultiplier tubes and the like so as to provide an electronic pulse information output on the output line 13 to be fed to the gamma camera console 14 also of suitable known construction including computer devices, deflection and display electronics, etc. Typically, the gamma camera console 14 may include a first and second cathode ray tube display in the form of the so-called "A" scope 16 and "B" scope 17. Both scopes 16, 17 display scintillations in respect to an X-Y axis and the B scope 17 is coupled by means of a line 18 to transfer its X-Y-Z pulse information to be directly coupled to a cathode ray tube section 19 contained in a scan converter unit 21. A video camera 22 disposed in alignment with CRT section 19 forming a display of the scintillations derived from the nuclear medicine contained within the patient 11 is arranged in focus with the face of section 19 so as to transmit the display taken therefrom via line 23 as will be described further below.

As thus arranged, camera section 22 includes a target portion of a type common to most video camera sections and upon which representations of scintillations indicated by the dots appearing on CRT section 19 will be stored until the accumulated charge is removed from the target of camera section 22 by an unblanking pulse submitted thereto. Accordingly, until an unblanking pulse is received by video camera section 22, the display from CRT section 19 will cause an accumulation of representations thereof on the target so as to integrate the representations over short periods of time.

A cyclically moving record medium such as video disc recorder 24 of a type disclosed in my pending application Ser. No. 310,668, entitled "Single Field Video Recording System and Method," and assigned to the same assignee herein, is arranged to rotate about the axis 26 whereby video from camera section 22 can be recorded thereon in each of a number of successive tracks as the camera section 22 receives an unblanking pulse from time to time. A vertical sync pulse 27 is prerecorded on disc 28 to be read by transducer 29 so as to provide a series of successive vertical sync pulses 27 recorded on the medium.

Means for unblanking camera section 22 for the period between successive vertical sync pulses read from disc 28 serves to discharge accumulated representations of the scintillations stored on the target of camera section 22. Thus, the discharged information may be recorded as a video field on a separate track of the record disc 28 between successive sync pulses.

Thus, sync pulses 27 are fed along line 31 to camera section 22 and beam blanking pulses are fed along line 32 to camera section 22 for controlling the operation of the camera section in conventional style for recording successive individual tracks upon disc 28 in the manner disclosed in my above identified application.

It has been observed that defocussing the CRT section 19 by introducing a noise generator so as to manipulate the size, shape, focus and brightness of the scintillation dots can serve to aid considerably in deriving additional information by a medical person in recording the information on disc 28. Accordingly, a defocus control unit 33 of conventional construction is coupled directly to CRT section 19 for the foregoing purpose.

For purposes of displaying or reading out material which has been recorded on disc 28, a conventional video display tube 36 is disposed within a light-tight cover 37 and in alignment with the lens 38 of a photographic camera 39. The television picture tube 36 is coupled to line 31 to receive the sync pulses therefrom and is coupled by means of a video line 41 to the disc recorder unit 24 to receive video information therefrom and also is coupled by means of a lead 42 to the disc recorder unit 24 to receive a series of display blanking pulses serving to display a sequence of tracks of information from the disc recorder unit 24.

By means well known in the art, the material recorded on the tracks of disc 28 can be replayed at a high sequence of reproduction or a low sequence of reproduction in order to provide a fast or slow motion effect and accordingly by having the scintillations previously recorded in discrete tracks of disc 28, the effect of varying flow rates can be readily observed without involving the patient.

From the foregoing, it is readily believed that there has been provided an improved scintillation recording system.

From the foregoing, it will be readily evident that there is disclosed herein method of recording transient integrated scintillations from a nuclear source such as found in the body of a patient injected with radioactive material wherein the method comprises the steps of forming an electronic display of visible dots oriented with respect to horizontal and vertical axes on the face of the display and then disposing a video camera in position to view the display and to accumulate electric representations of the dots on the target portion of the camera. Periodically, the representation accumulated on the target are removed and recorded in a discrete track of a cyclic moving record medium. In this manner, each video field recorded on the disc constitutes the integration over a short period of time of a number of dots derived from the nuclear scintillating display.

The foregoing method provides the advantages noted above wherein the accumulation of the radioactive material can be located from time to time during the course of the flow of the medicine through the body of the patient. Also, the rate of flow through the body of the patient can be varied by reproducing the recorded video tracks of the disc at different rates and recording same on a film camera such as the camera 39.

I claim:

1. A system for recording transient nuclear scintillations comprising a source of nuclear radiation, means for detecting and converting the radiation into an electronic display of random scintillating sensible dots disposed with respect to horizontal and vertical axes upon a display, a video camera disposed in alignment with said display for viewing said display, a cyclically moving record medium, a video sync pulse recorded on said medium, means for unblanking said camera to discharge accumulated representations of said scintillations stored on the target of said camera to be recorded as a video field on a track of said medium in a manner to be reproduced between successive said sync pulses.

2. A system according to claim 1 comprising a cathode ray tube having deflection plates forming a part of said display and means directly coupled to the deflection plates for defocussing said dots on said display to manipulate the size, shape, focus and brightness of said dots.

3. The method of recording transient integrated scintillations of a nuclear source comprising the steps of forming an electronic display of visible dots oriented with respect to horizontal and vertical axes on the face of said display, disposing a video camera in position to view said dispaly and to accumulate on the target of said camera a collection of electric representations of said dots, and periodically removing each said collection of representations and successively recording said collections each in a discrete track of a cyclic moving record medium.

* * * * *